(12) United States Patent
Grumbacher et al.

(10) Patent No.: US 9,737,092 B2
(45) Date of Patent: Aug. 22, 2017

(54) HERBAL GRINDER AND RESERVOIR

(71) Applicants: Matthew Grumbacher, Basalt, CO (US); David Markle, Stone Harbor, NJ (US)

(72) Inventors: Matthew Grumbacher, Basalt, CO (US); David Markle, Stone Harbor, NJ (US)

(73) Assignee: ASPENDAM, LLC, Aspen, CO (US)

( * ) Notice: Subject to any disclaimer, the term of this patent is extended or adjusted under 35 U.S.C. 154(b) by 109 days.

(21) Appl. No.: 14/290,577

(22) Filed: May 29, 2014

(65) Prior Publication Data

US 2014/0353412 A1    Dec. 4, 2014

Related U.S. Application Data

(60) Provisional application No. 61/829,568, filed on May 31, 2013.

(51) Int. Cl.
*A47J 42/40*    (2006.01)
*A24C 5/40*    (2006.01)
*B02C 18/08*    (2006.01)
*A47J 42/24*    (2006.01)

(52) U.S. Cl.
CPC .............. *A24C 5/40* (2013.01); *A47J 42/24* (2013.01); *B02C 18/08* (2013.01)

(58) Field of Classification Search
CPC .............. A24C 5/40; B02C 18/08; A47J 42/24
USPC ........ 241/168, 169.1, 169.2, 273.1–273.3, 95
See application file for complete search history.

(56) References Cited

U.S. PATENT DOCUMENTS

| | | | |
|---|---|---|---|
| 854,384 A | 5/1907 | Ross | |
| 4,304,363 A | 12/1981 | Atkielski | |
| 7,422,170 B2 * | 9/2008 | Bao | 241/168 |
| 8,393,563 B2 * | 3/2013 | Chaoui et al. | 241/168 |
| 8,613,402 B2 * | 12/2013 | Lefkovitz | 241/30 |
| 2013/0015278 A1 | 1/2013 | Edwards | |

OTHER PUBLICATIONS http://santacruzshredder.com.

* cited by examiner

*Primary Examiner* — Faye Francis
*Assistant Examiner* — Onekki Jolly
(74) *Attorney, Agent, or Firm* — Cozen O'Connor

(57) ABSTRACT

An herbal grinder and reservoir having a conical shape wherein said herbal grinder comprises a top grinding cap and a grinding section comprising a plurality of grinding knives; and wherein said grinding section comprises a plate having a drop through pattern for allowing ground material to exit the grinding section and fall into the reservoir.

6 Claims, 11 Drawing Sheets

HERBAL GRINDER AND RESERVOIR

CROSS-REFERENCE TO RELATED APPLICATION

This application claims priority to U.S. provisional application Ser. No. 61/829,568 filed May 31, 2013, which is incorporated herein by reference in its entirety.

FIELD OF THE INVENTION

Presently disclosed embodiments are related to shredder and reservoir device, particularly suited for shredding herbs, tobacco, or other products into the attached reservoir for subsequent use in with rolling papers or other implement for smoking said tobacco or other products.

This application claims priority to U.S. provisional application Ser. No. 61/831,491 filed Jun. 18, 2013, which is incorporated herein by reference in its entirety.

BACKGROUND

There are various tobacco shredder or grinder products on the market, that allow rough tobacco leaves to be ground into a fine material for suitable use in a pipe or rolling paper, or other device. However, these shredders suffer from a design flaw that prevents storage of shredded tobacco and ease of use of the stored tobacco.

Producing rolled cigarettes or tobacco for a pipe requires that the tobacco is finely ground and of generally uniform size, to allow for even and smooth burning of the tobacco. Smokers have utilized numerous tools to grind tobacco, including mortar and pestle and crushing tobacco leaves by hand, to create suitable smoking material. By the turn of the 20th century, consumers demanded more appropriate tools for grinding of their tobacco.

For example, U.S. Pat. No. 854,384 issued in 1907 utilized a bag and two opposite faces roughened or serrated into which dried tobacco leaves may be inserted. By applying pressure to the opposing faces, the dried tobacco leaves may be ground into a size suitable for rolling into cigarettes or for smoking in a pipe.

Subsequently, further development of tobacco grinders included U.S. Pat. No. 4,304,363, which teaches a tobacco grinder with a top and bottom half that come together to form an internal cavity having a grinding shaft. When the top half is rotated relative to the lower half, the grinding shaft rotates to grind the dried tobacco leaves within the internal cavity. After the tobacco is ground, it is passed through a sieve into a cap where it is held until the user is ready to smoke it.

Additional grinders utilize three cavities and comprise a top cap and a bottom cap. The top half of the first cavity is formed by the top cap. A plurality of grinding knives protrudes from the top cap. The bottom half of the first cavity also has a plurality of grinding knives and several large holes that lead into the second cavity. The second cavity has a screen that leads into the third cavity. The bottom half of the third cavity is formed by the bottom cap of the grinder.

A dried tobacco leaf is placed inside the first cavity. The top cap is then rotated relative to the rest of the grinder allowing the grinding knives to cut, grind, or shred the tobacco into smaller pieces. The smaller tobacco pieces the pass through the large holes into the second cavity and then through the screen into the third cavity. The pieces in the second cavity can then be directed back to the first cavity for further grinding. The ground tobacco in the third cavity is collected in the bottom cap which is removed by the user when ready to smoke.

U.S. Pat. No. 7,422,170 was issued in 2008 and teaches a tobacco grinder that is very similar to the a tobacco grinder as described above except that the grinding knives protrude from two separate grinding plates that are separate and independent parts that are removable from the rest of the grinder. This configuration allows the grinding plates, thus the grinding knives, to be manufactured separately and of different material as the rest of the grinder so as to reduce the cost of manufacturing.

U.S. Pat. No. 8,393,563 describes a similar tobacco grinder that further includes a viewing window to allow a user to determine how much tobacco has been ground.

U.S. App. Serial No. 2013/0015278 is a grinder much like the one described in U.S. Pat. No. 8,393,563, but having no window for viewing the ground product.

However, one of the frequent issues with these grinders is that the fall patterns or screens used to aid in grinding the material clog easily, and this often wastes some of the ground product. Furthermore, because of the configuration of the grinder and any reservoir, it is difficult to pour the ground product into a small device for use. Indeed, it is often preferable to dump the material into a larger container or onto a magazine or other foldable paper, so that the material can then be appropriately placed, with particularity, into a device for use.

In view of the problems associated with current grinders or shredders, there remains a need in the marketplace for an improved grinder or shredder, and reservoir device that provides for consistent and even shredding of a material, but provides for a suitable reservoir that provides for easy use and dispensing of the shredded or ground material.

SUMMARY

Embodiments of the present disclosure relate to an herbal grinder and reservoir device wherein the reservoir has a length, a diameter, and two open ends, and a grinder portion disposed a one end of the length of the reservoir and is detachably coupled to said reservoir, and on said opposing opening, a sealable cap. Said reservoir being conical in shape, wherein said narrower portion is at the capped end, and said wider portion detachably couples to said grinder.

An additional aspect of the present disclosure includes a herbal shredder comprising a reservoir and a shredder; wherein said shredder is cylindrical in shape, having a length and a diameter and comprises a grinder top, a grinder bottom, and a plurality of knives; wherein said grinder top and said grinder bottom comprises a plurality of knives arranged parallel to the length so as to interlace between knives attached to the grinder top and the grinder bottom; wherein said grinder bottom comprises a top sidewall having an outer diameter less than the inner diameter of the grinder top, allowing said grinder top to slide down over said top sidewall, and said grinder top being able to rotate around said top sidewall; said reservoir being conical in shape having two open ends have a first larger diameter, and a second smaller diameter, and being and non-opaque, wherein said first larger diameter connects to said shredder, and said second smaller diameter having a cap that secures said second small diameter end to be selectively opened and closed with said cap.

An additional aspect of the present disclosure includes a grinder comprising: a top cap having a bottom opening and a plurality of top grinding knives protruding downward; a middle section having a top opening that is removably inserted into said bottom opening of said top cap, a bottom opening, and a plate, wherein said plate comprises a plurality of bottom grinding knives protruding upward and a plurality of holes; and a reservoir section, having a top opening and a bottom opening, said top opening having a diameter so as to pair with and secure to said middle section, and said bottom opening being of a smaller diameter than said top opening; said reservoir being substantially transparent; said bottom opening having a bottom cap having a diameter to as to pair with and secure to said bottom opening.

A shredder comprising a cap and a base, wherein said cap having a bottom opening and a plurality of top grinding knives protruding downward; wherein said top grinding knives are spatially oriented in a circular pattern, and each knife having the shape of an arrow; and wherein said base having a top opening that is removably inserted into said bottom opening of said cap, and wherein said base comprises a plate comprising a plurality of bottom grinding knives protruding upward; wherein said plate comprises a plurality of openings having either a circular or an unequal oblong shape, wherein a larger end of said unequal oblong shape is positioned at the outer circumference of the base, and said smaller end of said unequal oblong shape is positioned near the center of the base; and further comprising wherein said top knives and said bottom knives are positioned in opposite directions so that rotation of the top or bottom portion is suitable for grinding materials disposed therein; and wherein said holes in said plate allow for ground material to drop from the grinder portion into the reservoir.

A herbal shredder comprising a reservoir and a shredder; wherein said shredder is cylindrical in shape, having a length, an inner diameter, an outer diameter, and comprises a grinder top, a grinder bottom, and a plurality of knives; wherein said grinder top and said grinder bottom each comprise a plurality of knives extending parallel to the length of the grinder and spatially arranged so as to allow the knives attached to the grinder top and the grinder bottom to rotate around one another without contact; wherein said grinder bottom comprises a top sidewall having an outer diameter less than the inner diameter of the grinder top, allowing said grinder top to slide down over said top sidewall, and said grinder top being able to rotate around said top sidewall; said reservoir being conical in shape having two open ends one having a larger diameter than the opposing end, and being and non-opaque, wherein said larger diameter end connects to said shredder, and said second smaller diameter end having a cap that secures said second small diameter end to be selectively opened and closed with said cap.

A grinder comprising: a top cap, a grinding section, and a reservoir section; wherein said top cap having a bottom opening and a plurality of top grinding knives protruding downward; said grinding section having a top opening that is capable of being removably inserted into said bottom opening of said top cap, a bottom opening, and a plate circumferentially attached to the inner diameter of the grinding section, wherein said plate comprises a plurality of bottom grinding knives protruding upward and a plurality of holes disposed of on said plate; and a reservoir section, having a top opening and a bottom opening, said top opening having a diameter so as to pair with and removably secure to the bottom opening of said grinder section, and said bottom opening being of a smaller diameter than said top opening; said reservoir being non-opaque; said bottom opening having a bottom cap having a diameter to as to pair with and removably secure to said bottom opening.

A device being a combination herbal grinder and storage container comprising: a grinder having a grinding cap and a grinding base; wherein the grinding cap comprises a plurality of grinding elements extending from the underside of the grinding cap, and a plurality of grinding elements extending vertically from a plate disposed of on the grinding base; wherein the grinding elements pair to form a grinding device; wherein the grinding base plate further comprises a plurality of openings disposed of adjacent to the grinding elements that allow ground material to pass through the grinding base into the storage container; and wherein the storage container is conical in shape and having a larger and smaller open ends, wherein the larger open end selectively attaches to the grinder base and the smaller open end comprises a selectably attachable cap.

Further embodiments comprise a particularly designed grinding cap for improving efficiency of grinding, wherein the grinder as described above further comprises wherein said grinding cap comprises six arrow shaped grinding knives spatially oriented such that there are three pairs of grinding knives wherein each pair has the arrow heads orienting towards one another, and orients the tail of each arrow to the tail of an adjacent arrow of another pair, and further comprising a central knife having a six sided star shape that is spatially oriented on the center axis of the top cap and wherein the three pairs of grinding knives are spatially oriented around the center axis.

Further embodiments comprise a particularly designed grinding base for improving efficiency of grinding and prevention of clogs in a grinding screen, wherein the grinder as described above further comprises wherein said grinding base comprises four arrow shaped grinding knives that are spatially arranged away from the center axis of the grinder bottom, and are oriented in two pairs such that the pairs have the heads of the arrows pointed towards one another, around a circular plane, and the tails pointing towards the tails of the opposing pair, and wherein said grinding plate comprises a set of four drop circles and four unequal oblong shaped holes, wherein the drop circles and the unequal oblong shape holes are oriented to alternate around a center axis, and wherein the outer edge of the holes and the unequal oblong shapes are about equal in relation to the space from the inner wall of the grinder section; and wherein the inner portion of the oblong shaped holes extends past the location of the grinder knives which are oriented to be in-front of the drop circles from the center axis.

DETAILED DESCRIPTION OF PREFERRED EMBODIMENTS

Figure 1:
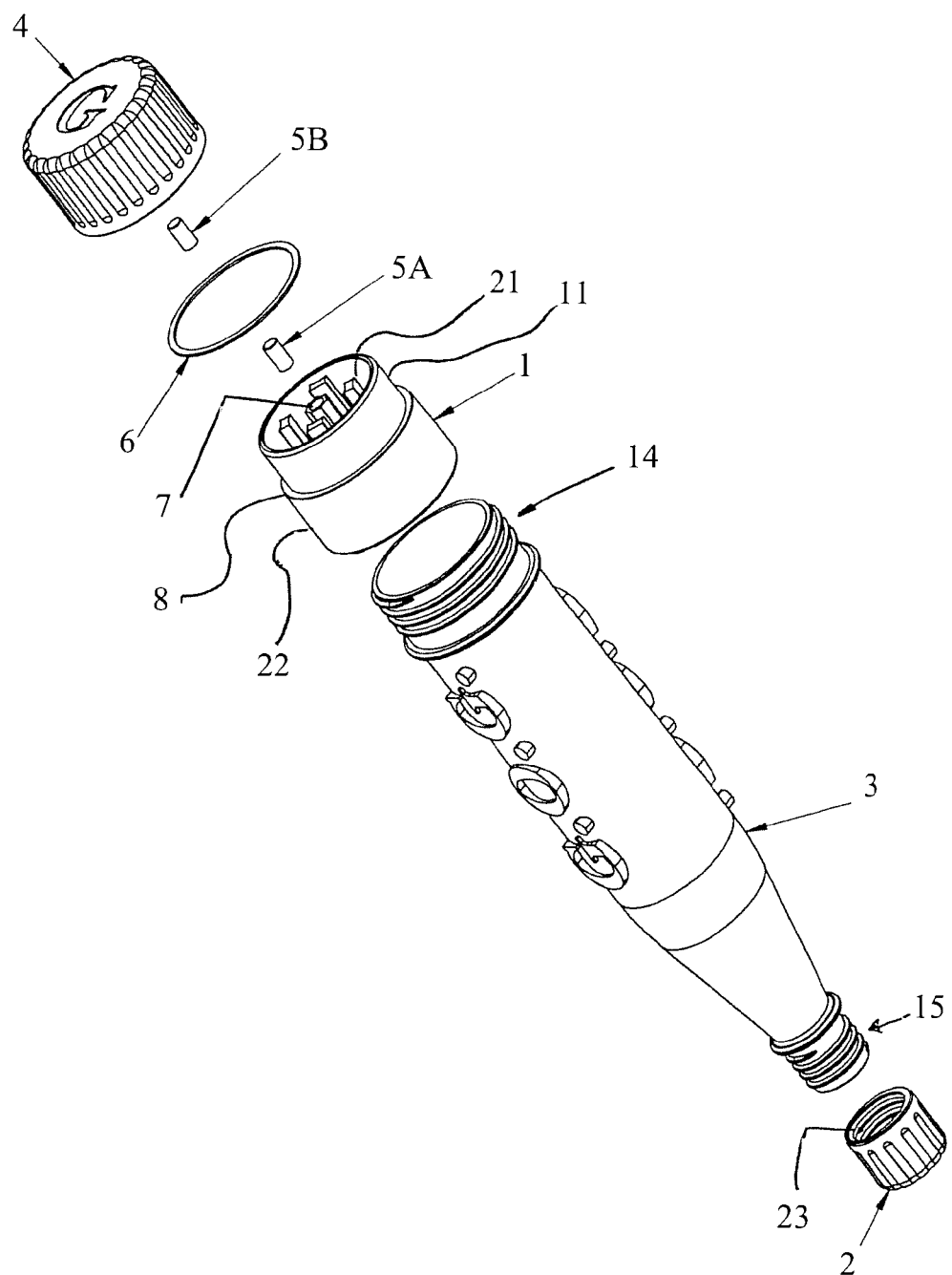
FIG. 1 is a side view of one embodiment of the invention described herein.

All references cited herein are hereby incorporated by reference in their entirety.

As used herein, the term "about" is intended to encompass a range of values ±10% of the specified value(s). For example, the phrase "about 20" is intended to encompass ±10% of 20, i.e. from 18 to 22, inclusive.

As used herein, the term "shredder" or "grinder" is used interchangeably and the terms are intended to mean a device capable of grinding or shredding a material into small pieces, typically a dried plant material.

An herbal grinder comprises a grinder 9, having a grinder top 4 and a grinder bottom 1 (also referred to as a grinding section), wherein a material suitable for grinding is placed into the grinder bottom 1, the grinder top 4 then being placed over and around the top sidewall 11, and the grinder top 4, being rotated, so that the material placed in the grinder bottom 1, is ground into a fine material that then passes through the grinder screen 13 upon being ground. The fineness of the ground material is dependent on the size of the openings in the grinder screen 13 and the design of the upper and lower knives. Once the material passes through the grinder screen 13, it falls into the reservoir 3, where it can be stored. In certain embodiments, the use of a washer 6 then provides an air tight seal to keep the ground product fresh for future use. In further embodiments, a grinder cap 12 can be used to seal the reservoir 3 instead of the grinder 9.

Figures 2A, 2B:
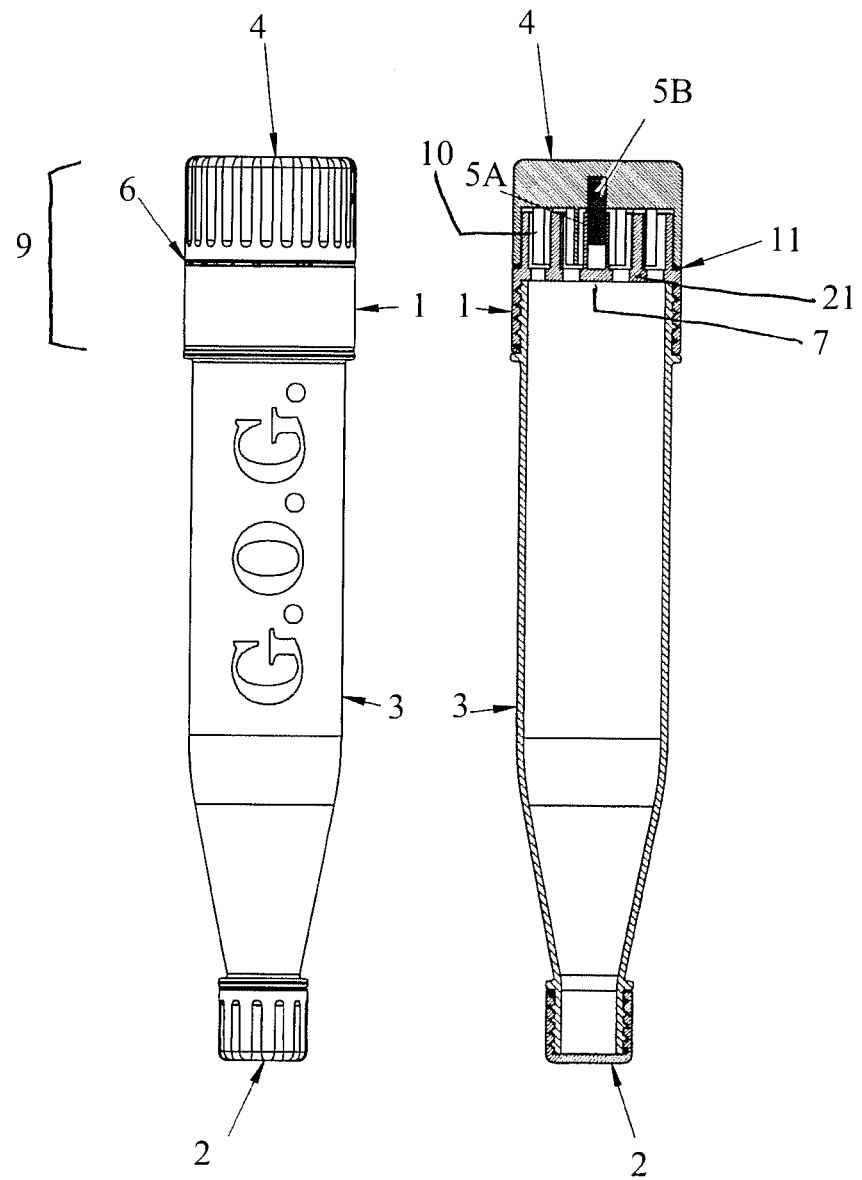
FIG. 2A and FIG. 2B are a side view and a cut-out side view of one embodiment of the invention described herein.

In view of FIG. 1, an exploded view of an embodiment of the herbal grinder comprises a grinder top 4, a grinder bottom 1 (aka grinding section), a reservoir 3, and a reservoir cap 2. The grinder top 4 is cylindrical in shape, having a closed top and an open bottom. The grinder bottom 1 is cylindrical in shape and is defined by a top side wall 11 and a bottom side wall 22. The bottom sidewall 22 has an outer diameter that is about equal to the outer diameter of the grinder top 4. The top side wall 11 has an outer diameter that is slightly smaller than the diameter of the grinder top 4 or bottom side wall 22, so that the inner diameter (16) of the open bottom on the grinder top 4 can slide over and be placed directly around the top sidewall 11, as is depicted in FIG. 2A or 2B and shown in FIG. 3 for example, and slides down to be in contact with or nearly in contact with the grinder edge 8. The outer diameter of the grinder top 4 is about 5 to about 50 mm or about 10 to about 30 mm.

Figure 3:
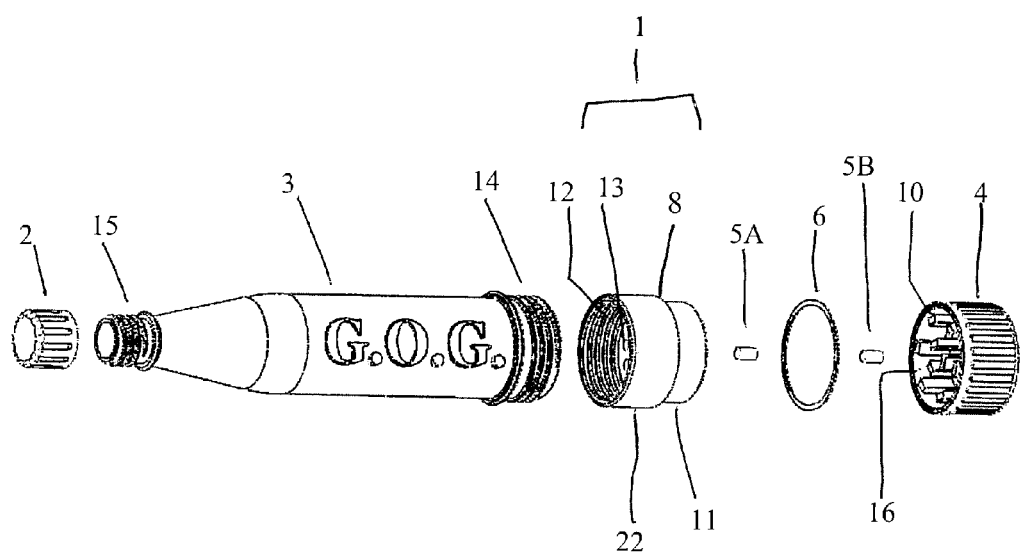
FIG. 3 is a perspective view of elements of one embodiment of the invention described herein.

FIG. 1 also identifies lower knives 21, which are attached in a vertically oriented position, to a grinder screen disposed of in said grinder bottom 1. The lower knives 21 are oriented so as to have an opposing set of upper knives 10 as seen in FIG. 3, which are connected in a vertical manner to the grinder top 4. Four lower knives 21 are shown in FIG. 1, and a further magnet sleeve 7 is configured in the middle of the four grinder knives 21. Magnets 5A and 5B are further depicted and are situated so that opposite poles aid in securing the grinder top 4 to the grinder bottom 1. The magnet sleeve 7 serves not only to hold the magnet, but also as a central grinder knife. There are nine upper knives 10, shown on FIG. 3. There are three upper knives 10, oriented to surround the magnet sleeve 7, and six additional upper knives 10 oriented to rotate to the outside of the lower knives 21. Additional configurations of the knives may be incorporated to provide finer or courser grinding. In other embodiments, a washer 6 is further disposed of between the grinder top 4 and the grinder bottom 1, wherein the washer 6 fits over and around the top side wall 11.

A reservoir 3 when used in the embodiments described herein comprises a generally conical shape, and comprises two open ends. The reservoir is made of a plastic material that is transparent or translucent, and is non-opaque. Other suitable rigid, non-opaque materials may also be utilized in certain embodiments. The purpose of the material being transparent or translucent is to be able to see the ground product in the reservoir 3. The reservoir 3 is about 2 to about 6 inches long and more particularly and 2 to about 5 inches long, or about 3 to about 4 inches long. The reservoir being conical in shape has a larger diameter at one end than the opposing end. The top end of the reservoir 3 terminates with reservoir top threads 14, where the diameter of the reservoir 3 at this point is slightly smaller than the diameter of the bottom side wall 22, so that the male threads on the reservoir top threads 14 can connect to the female threads situated in the grinder bottom 1. Conversely, the opposing bottom end of the reservoir 3 has a diameter about two to about five times smaller than the diameter of the top end. The larger diameter has an inner diameter that is in concert with the diameter of the grinder top 4, about 5 to about 60 mm or about 10 to about 25 mm. The smaller diameter has an inner diameter of about 1 to about 30 mm, or about 1 to about 10 mm.

The bottom of the reservoir is tapered, as it is a conical shape, to allow the ground material to be placed into a hand rolled paper or in to a pipe or other device, for instance, to smoke the ground material. The tapered end helps to direct the ground material to a particular location when dispensing and prevent spilling of the material, when placing into a small opening or space. It is intended that the grinder can be used with other suitable dried plant materials for use in any number of smoking devices.

The reservoir bottom threads 15 are also male threads, and have a diameter such that they pair and secure with the reservoir cap 2, and the cap threads 23, which are female. In this sense, female threads are internal threads, while male threads are external threads. This provides that a male/female pair is complementary and the threads are situated to allow selective attachment of the two parts. In each instance, the male and female threads may be reversed so that the male threads are female and the female threads are male, so long as each continues to be a pair allowing for the features to selectively secure to one another. Alternatively, the threads may be replaced by an attachment or securing means that allows for selective attachment between two devices such as notches, latches, friction connection, or other suitable attachment means as is known to one of ordinary skill in the art.

FIGS. 2A and 2B depict certain embodiments of the herbal grinder depicting the features as attached to the reservoir 3 such as when a user would be actively grinding material. In FIG. 2A, the reservoir cap 2 and the grinder 9 are secured to the reservoir 3. Furthermore, the grinder top 4 is placed, slideably attached to the grinder bottom 1.

FIG. 2B depicts a cutout view of FIG. 2A depicting the upper knives 10 and the lower knives 21, so configured to as to combine to form a set of grinding knives. Indeed, the upper knives 10 and lower knives 21 are configured so that the grinder top 4 or the grinder bottom 1 may be rotated, where the grinder top 4 rotates around the top sidewall 11, and that the upper knives rotate with the grinder top 4 and the lower knives 21 rotate with the grinder bottom 1, but the knives do not contact one another as they rotate. Instead, there is a small amount of space between the upper and lower knives 10, 21, where material is ground as it is forced between these small spaces. The upper and lower knives are intended to be about the same length, so as to make a paired feature, with the knives having a length of about 1 to about 30 mm, or about 1 to about 10 mm in length. The depth of the knives provides that there is about 0.1 mm to about 5 mm in space between the end of the knives and the plates to which the upper and lower knives 10 and 21 are attached, so that the knives can rotate without contacting the underlying connective plate of the opposing knives. The space between, for instance the upper knives 10 and the grinder screen 13, may be modified based on the desired size of the ground material, thus making the space smaller or larger by increasing or decreasing the length of the knives. The upper knives 10 and the lower knives 21 are spatially engaged so they do not contact one another when the grinder top 4 is situated on the grinder bottom 1. Accordingly the upper knives 10 and lower knives 21 are spatially separated by about 0.1 to about 10 mm and preferably about 0.25 mm to about 5 mm, or about 0.3 mm to about 3 mm or about 0.5 mm to about 2.0 mm.

The grinder top 4 and grinder bottom 1 are manufactured of aluminum. Other suitable metals or metal alloys, plastics, carbon fiber, or other suitable composite or resin based material may also be utilized as is known in the art. Together, as shown in FIG. 2A, the grinder top 4, the grinder bottom 1, and the attachments to those features make up the grinder 9 feature of the product.

The grinder top 4 is held onto the grinder bottom 1 by magnetic attachment, whereby a magnet is attached within the magnet sleeve 7 and into the grinder top 4, so that the grinder top 4 is magnetically attracted to the grinder bottom 1. There being a bottom magnet 5A and an upper magnet 5B, where the bottom magnet 5A is secured within the magnet sleeve 7, and the top magnet 5B is secured to the center portion of the grinder top 4 and is imbedded, so as to sit flush, or nearly flush on the surface of the grinder top 4. However, the grinder sleeve 7 may in other embodiments be secured to the grinder top 4 instead of the grinder bottom 1. In either case, the magnets are intended to be paired to as to detachably secure the grinder top 4 to the grinder bottom 1

FIG. 3 depicts an embodiment that further identifies a circular grinder screen 13 disposed of in the grinder bottom 1. The circular grinder screen 13 is situated within the grinder bottom 1 and is disposed of at about the point of the grinder edge 8. The grinder screen 13 is a cross section of the cylinder that makes up the grinder bottom 1 and is secured around the inner circumference of the grinder bottom 1.

The grinder screen 13 serves two purposes. First, the grinder screen has a plurality of holes in the screen, to allow ground material to pass through the screen. The diameter of the holes in the screen is about 1 mm in diameter. Other suitable diameters may be utilized and can be determined by the size of material that is wanted. For example, a diameter of about 0.1 mm to about 2.0 mm is suitable. The diameter of the holes should be uniform in diameter, as the intent is that the holes are a screen to prevent unsuitably sized material from passing into the reservoir 3. As a second function, the circular grinder screen 13 also functions as the attachment point for the lower knives 21 and the magnet sleeve 7. The grinder screen 13 may utilizes circular holes or other shaped holes in further embodiments. The holes are the same size and shape in some embodiments. In further embodiments, it is appropriate to use different shapes and/or different sizes of holes within the grinder screen 13. It may be further advantageous to have smaller holes in the middle and larger holes at the perimeter of the screen to aid in passing material from the grinder through the screen 13.

A washer 6 may be utilized between the grinder bottom 1 and the grinder top 4 to aid in the pieces freely rotating around one another. The washer 6 may be secured to the grinder bottom 1, may be freely situated, or, in other circumstances, be removed from the device entirely. The washer may be made of rubber, plastic, metal, or other suitable material. By use of a washer, the magnetic forces secure the grinder top 4 to the grinder bottom 1, and provide a tight seal the grinder portion of the device. The seal may be air tight when used with a washer that acts as a gasket, but in other embodiments, the seal is not completely air tight, but simply secured to prevent the loss of ground material from the reservoir 3. Additionally, the washer 6 may be utilized to adjust the space between the upper knives 10 and the grinder screen 13 by using a thicker or thinner spacer.

Figure 4:
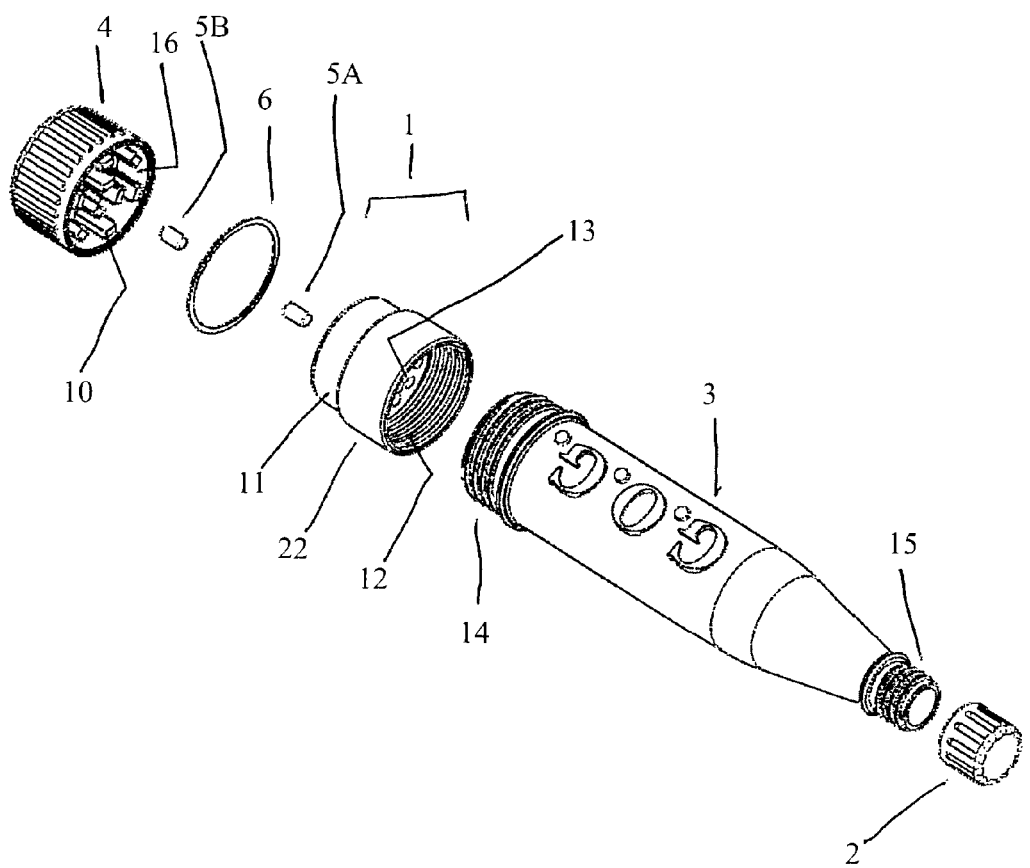
FIG. 4 is a further perspective view of elements of one embodiment of the invention described herein.

FIG. 4 shows similar features as FIG. 3, but from a different perspective, identifying the various features of an embodiment of the herbal grinder.

Figure 5:
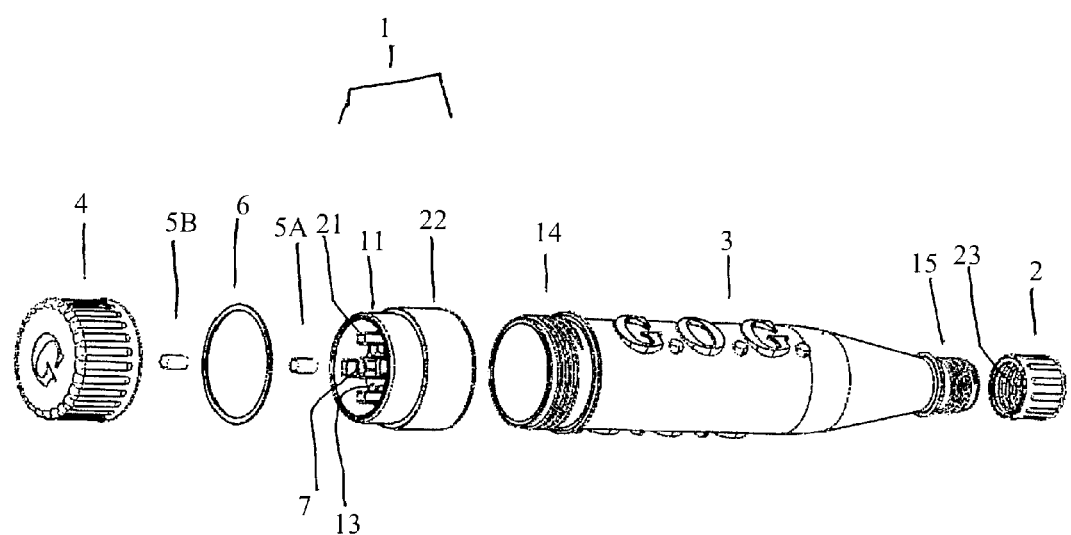
FIG. 5 is a further perspective view of elements of one embodiment of the invention described herein.

FIG. 5 shows a different perspective of FIG. 1. The top down view, with particular regard to the grinder bottom 1 and identifies the grinder screen 13, to which the lower knives 21 are attached.

Figure 6:
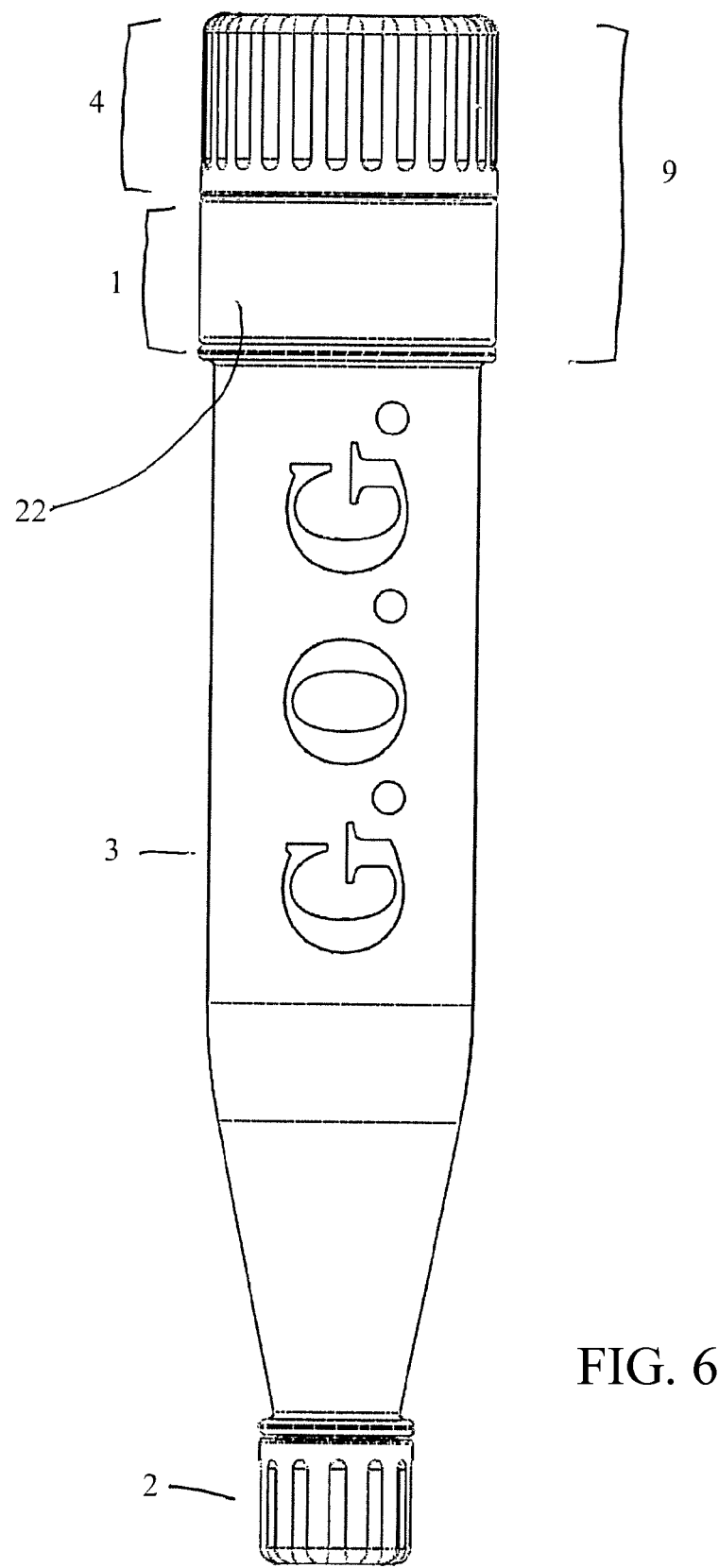
FIG. 6 is a side view of one embodiment of the herbal shredder.

FIG. 6 shows a side perspective of an embodiment of the invention described herein, wherein the reservoir cap 2 is secured to the reservoir 3, the grinder top 4 being magnetically secured to the grinder bottom 1, and the grinder bottom 1, being secured to the top portion of the reservoir 3.

Figure 7:
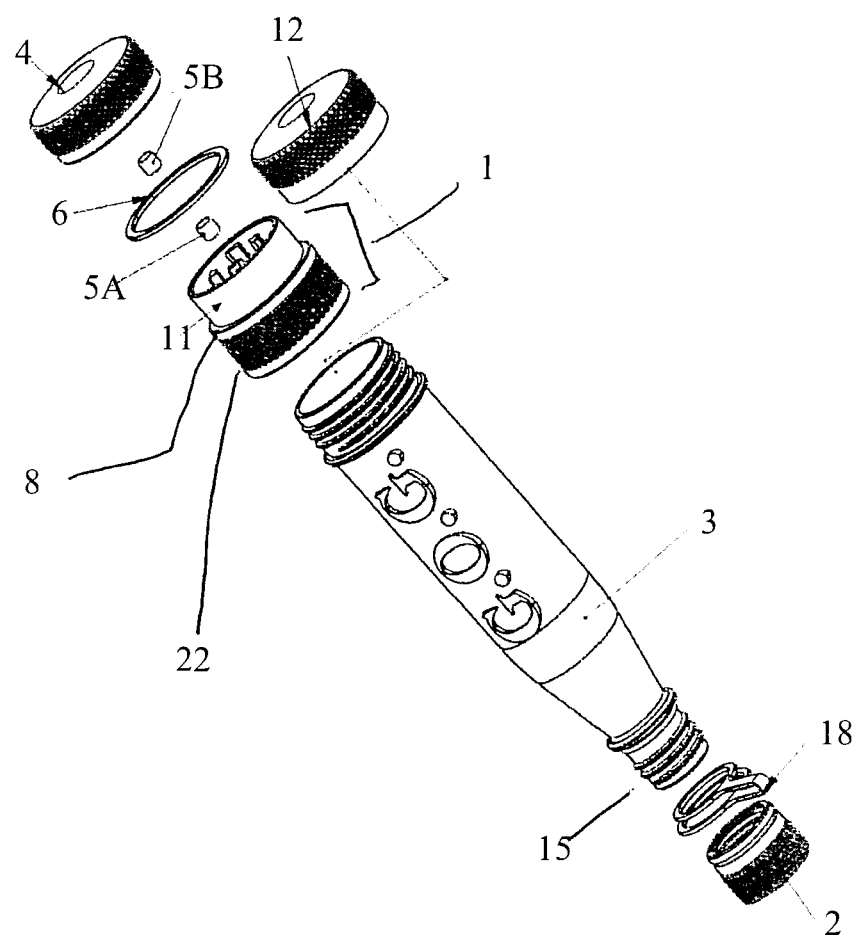
FIG. 7 is a side view of one embodiment of the herbal shredder.

FIG. 7 depicts a further embodiment of the reservoir and grinder wherein, a reservoir 3 feature in combination with a grinder 9. In particular, it is suitable in some embodiments to utilize a reservoir cap keeper 18. This keeper 18 secures to the reservoir cap 2 and slides over a portion of the reservoir bottom threads 15, thus preventing the reservoir cap 2 from being lost. Furthermore, a grinder cap 12 may be further utilized. This provides that once the grinder feature has been utilized, a grinder cap 12 may be advantageously secured to the reservoir 3 so that the ground material is fully secured within. This keeps the ground material fresh, prevents the loss of material, and minimizes odors from the ground material.

Figure 8:
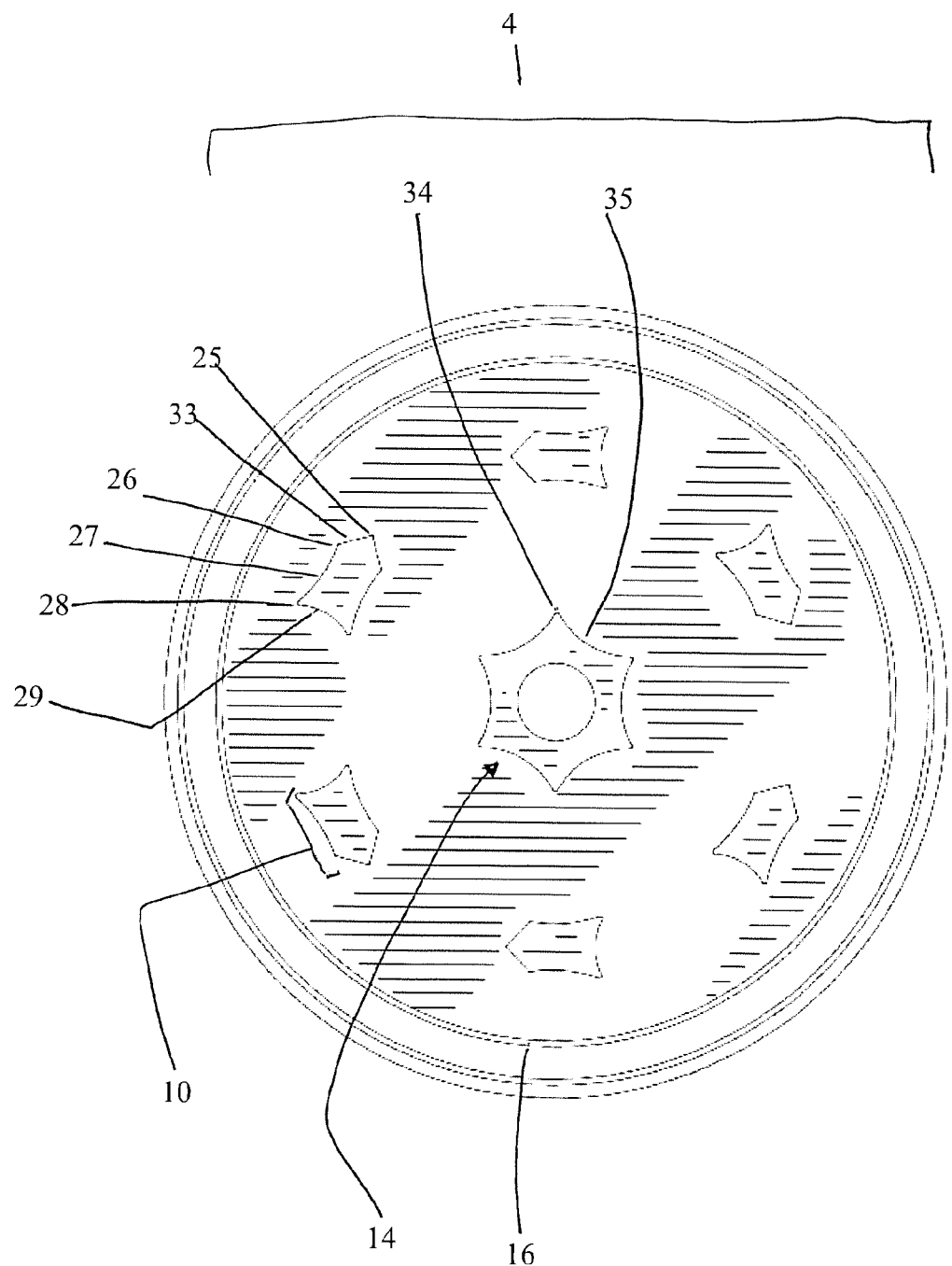
FIG. 8 is a detail of an embodiment of a portion of the shredder.

FIG. 8 further depicts an embodiment of the grinder top 4. In particular, depicted are arrow shaped upper knives 10 and a central knife 14. In particular, the central knife 14 has replaced the magnet sleeve as depicted in other embodiments. There are six upper knives 10, arranged in a circular pattern around the central knife 14. The upper knives 10 are situated between about 1 and 10 mm away from the grinder top inner sidewall 16. The upper knives 10 are further situated in pairs, such that two upper knives 10 face one another. This allows the grinder top 4 to be multi-directional for purposes of grinding.

The central knife 14 is shaped like a six sided star, having six points 34 and each of the points 34 are connected with a concave side 35. This provides for a central knife 14 that has six pointed and blade like features for aiding in grinding materials disposed of in the grinder.

FIG. 8 further details the particular features of two upper knives 10. The upper knives 10 have an "arrow" like shape, having an arrow head 25, two arrow arms 33, two arrow shoulders 26, two arrow tails 28, two arrow sides 27, and a rear 29. The arrow sides 27 have a concave shape and connect the shoulders 26 to the tails 28, and a further concave rear 29 connects the two tails 28. The arrow head 25 is created by having the two arrow arms 33 connect from the two arrow shoulder 26 with about a 90 degree angle at the arrow head 25. This provides that material contacting the arrow head 25 is ground with the point, and when the direction of the grinder is reversed, the two tails 28 become the contact point for material to be ground. Each arrow shaped knife is paired with a second knife so that two knives point towards one another, with an adjacent knife then pointing away from one another as depicted in FIG. 8. The knives have a length at the shoulders of about 0.064 inches and a length at the tail of about 0.080 inches, and a length of about 0.125 inches.

The size of each of the knives may be modified in certain embodiments. In particular, the size of the knives may have a length at the should between about 0.025 inches to about 0.25 inches, a length at the tail between about 0.025 inches to about 0.35 inches, and a side length of about 0.10 inches to about 0.50 inches. Furthermore, the angle at the head 25 may be between about 20 to about 160 degrees.

Figure 9:
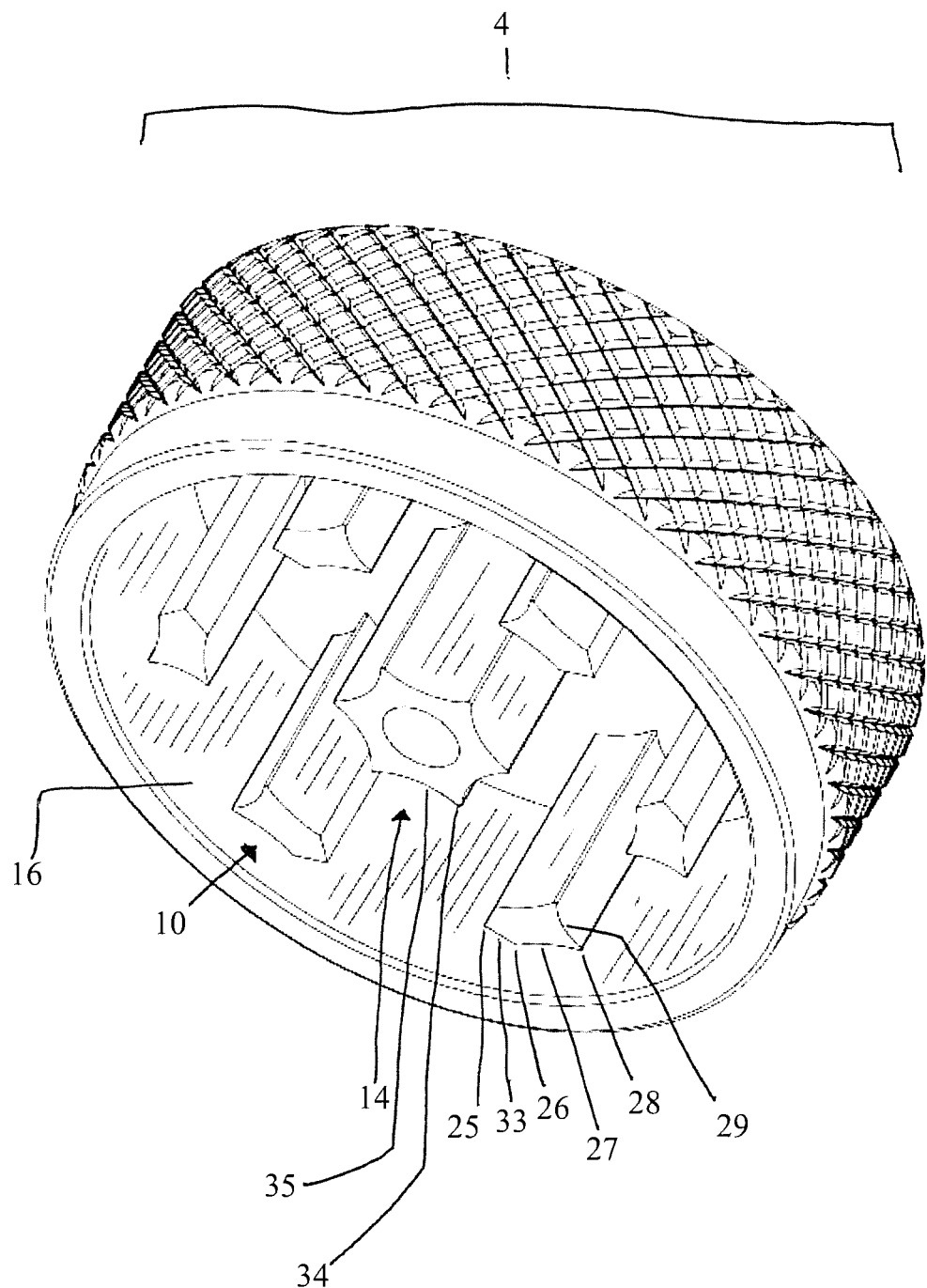
FIG. 9 is a detail of an embodiment of a portion of the shredder.

FIG. 9 depicts a perspective view of the grinder top 4 which depicts the depth and length of the upper knives 10 and the central knife 14. The grinder top 4 of FIG. 9 is then paired with a grinder bottom 1, an embodiment of which is depicted in FIGS. 10-13. Situated within the central knife 14 is one of the pair of magnets that is used to selectively secure the grinder top 4 to the grinder bottom 1.

The grinder top 1 comprises six arrow shaped grinding knives spatially oriented such that there are three pairs of grinding knives wherein each pair has the arrow heads orienting towards one another in a circular plane, and orients the tail of each arrow to the tail of an adjacent arrow of another pair, and further comprising a central knife having a six sided star shape that is spatially oriented on the center axis of the top cap and wherein the three pairs of grinding knives are spatially oriented around the center axis. This circular plane is the plane in which each of the knives moves as it rotates around the center axis.

Figure 10:
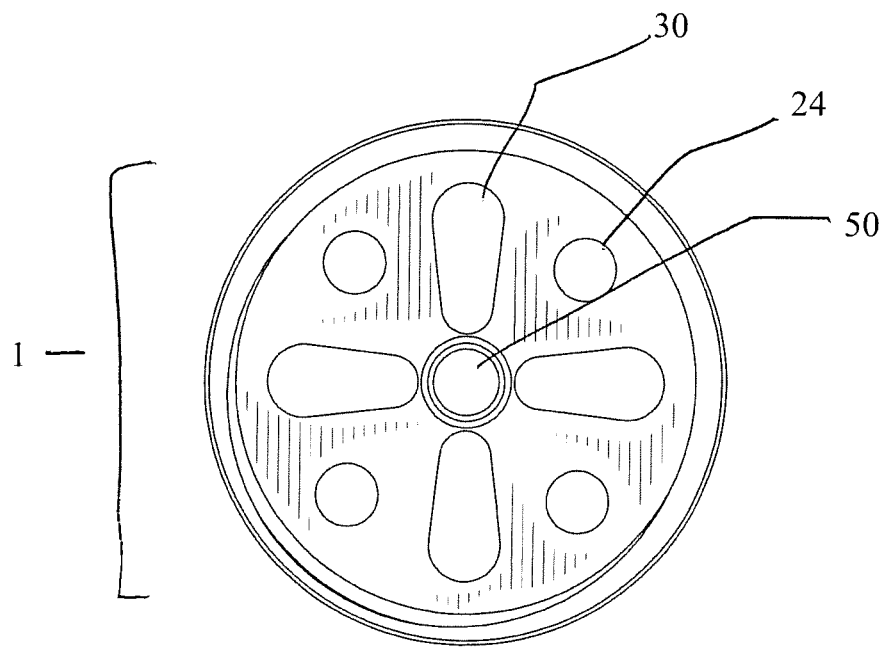
FIG. 10 is a detail of an embodiment of a portion of the shredder.

FIG. 10 depicts an embodiment of a grinder bottom 1 which comprises eight drop holes that allow ground material to pass from the grinder portion 9 to the reservoir 3. The grinder bottom has four drop circles 24 and four drop unequal oblong shapes 30. These drop circles 24 and unequal oblong shapes 30 are positioned to be immediately below the position of the upper knives 10. Accordingly, as the grinder is rotated, material is ground between the knives and material falls through the circles 24 and unequal oblong shapes 30 as the material is ground to such a size as to fit in the holes. The drop circles 24 have a diameter of about 0.118 inches and the unequal oblong shapes have a length of about 0.25 inches and a widest diameter of about 0.150 inches and narrow diameter of about 0.10 inches.

The size of the drop circles and unequal oblong shapes may be modified in certain embodiments wherein the diameter of the drop circles is about 0.05 inches and about 0.50 inches, and wherein the unequal oblong shapes have a length between about 0.10 inches and about 1.0 inches, and a widest diameter of about 0.50 inches to about 0.10 inches and narrow diameter of about 0.40 inches to about 0.05 inches. The shape of the drop holes, four being unequal oblong shape shaped, and four being circle shape maximizes the surface area for material to exit the grinder portion 9 and into the reservoir 3.

Figure 11:
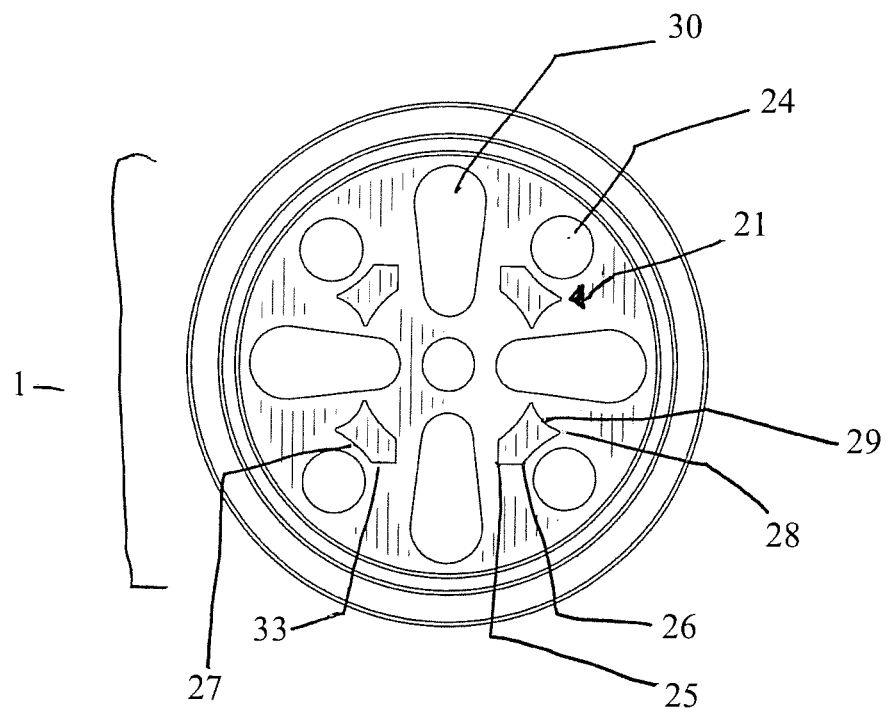
FIG. 11 is a detail of an embodiment of a portion of the shredder.

In view of FIG. 11, the grinder bottom comprises four lower knives 21 having the same arrow shaped pattern as the upper knives 10. The lower knives 10 are positioned so as to rotate with the grinder between the central knife 14 and the upper knives 10. When the grinder top 4 is placed on the grinder bottom, the central knife 14 is positioned at the center of the central axis 50, and rotates. The lower knives 21 then rotate around the central knife 14, and wherein the upper knives 10 rotate around the lower knives 21. Accordingly the three sets of knives do not contact one another, but work together to grind material placed within the grinder. Further disposed in this central axis is typically situated one of the pair of magnets.

The shape of the knives and of the holes in the grinder screen 13 was designed to improve upon existing grinders. Indeed, a particular problem of the prior art is that the grinder screens in the prior art devices frequently clog. This occurs when the screen has too fine of openings, or there are not enough openings to allow for material to easily pass through the screen. Clogging also damages and compresses the ground material, which is not advantageous for its use. Furthermore, several grinders use two or more screens to select different sized material. However, this occurs due to the inefficient grinding of the material, and typically results in lost material as it is attempted to be transferred from an internal screen.

In particular, the orientation of the grinding base comprises four arrow shaped grinding knives that are spatially arranged away from the center axis of the grinder bottom, and are oriented in two pairs such that the pairs have the heads of the arrows pointed towards one another, around a circular plane. These arrows then have the corresponding tails pointing towards the tails of the opposing pair. The grinding plate then further includes a set of four drop circles and four unequal oblong shaped holes. These drop circles and holes are oriented to alternate around the axis, and wherein the outer edge of the holes and the unequal oblong shapes are about equal in relation to the space from the inner wall of the grinder section. Indeed, when paired with the grinder top, the inner portion of the oblong shaped holes extends past the location of the grinder knives which are oriented to be in-front of the drop circles from the center axis.

In view of these problems, a number of tests were performed comparing the arrow shaped knives and the drop pattern having the circles 24 and oblong shapes 30 to currently available grinders, as well as additional new designs. The pattern depicted in FIGS. 8-13 proved advantageous. In particular, this embodiment proved superior to other grinding devices as it did not clog as easily as other patterns used in other prior art grinders. This eliminates waste that inevitably occurs due to having to open the grinder and unclog the screen or fall through plate. It also prevents unnecessary compression of the ground material which prevents optimal air flow when the material is used in a smoking device.

Furthermore, the embodiment described herein having the unequal oblong shape shaped and circle drop hole pattern as depicted in FIGS. 10 and 11 provided for a more consistent size ground material in a shorter amount of time than other patterns and grinders tested. This prevented the material from being ground too fine, which is a further problem that occurs in other grinders.

Indeed, when other grinders clog, inevitably material still in the grinding knives continues to be ground when it is already of sufficient size to normally pass through the screen. This results in material so small that it is difficult to handle, and results in non-uniformly ground material. Having non-uniform sized material is a particular problem when the material is intended to be smoked, as some portions burn faster than others resulting in a non-uniform use of the material and ultimately waste.

Accordingly, the grinder herein provides for grinding of material having a generally uniform size, i.e. wherein about 80% of the material is of a size between about 0.05 mm and 4 mm, and preferably between about 0.1 mm and 3 mm, and more preferably about 0.5 mm to about 2 mm, and more particularly wherein the ground material is about 0.75 mm to about 2 mm. By elimination of materials that are too large or too small, use of the ground material is improved.

Figure 12:
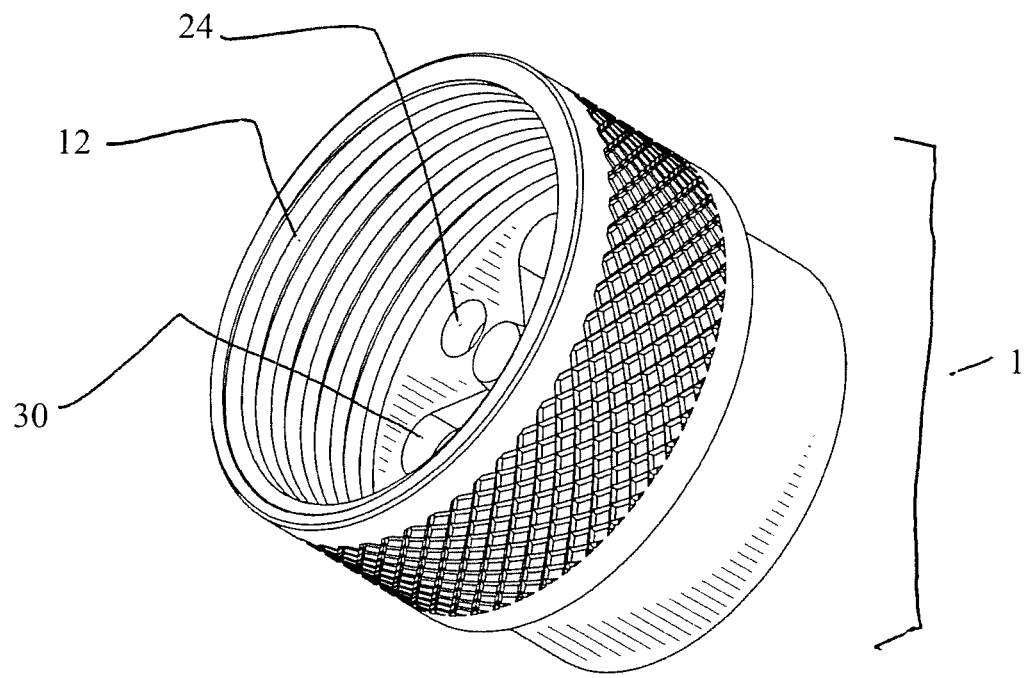
FIG. 12 is a detail of an embodiment of a portion of the shredder.

FIG. 12 further depicts a bottom perspective view of the grinder bottom 1, which depicts the drop circle 24 and the drop oblong shaped hole 30, as well as the internal threads 12 which allow the grinder bottom 1 to be secured to the reservoir 3.

Figure 13:
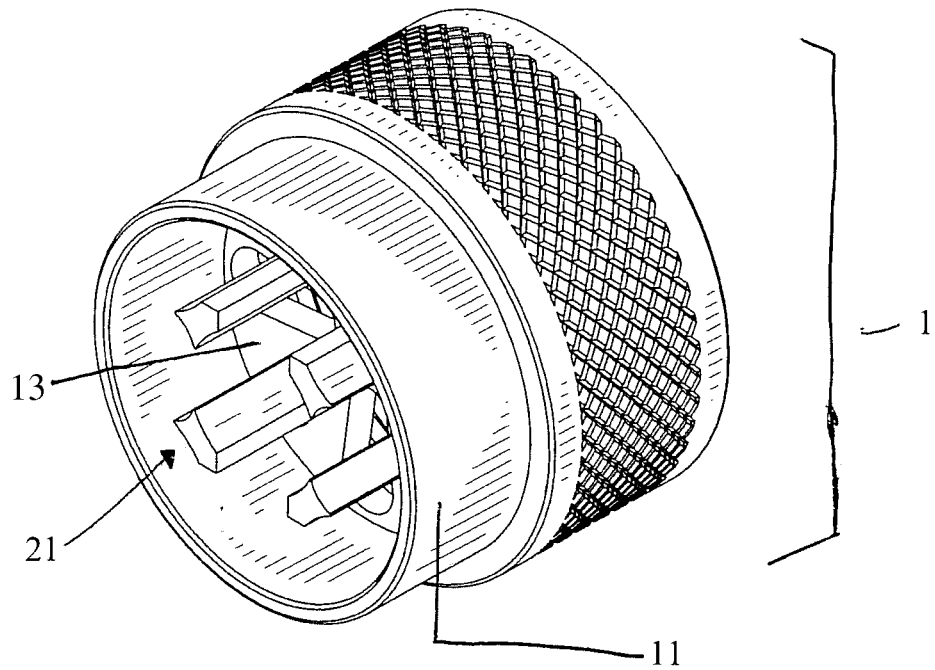
FIG. 13 is a detail of an embodiment of a portion of the shredder.

FIG. 13 depicts a top perspective view of the grinder bottom 1, particularly depicting the lower knives 21 as extending from the grinder plate 13. Further depicted is the change in the depth of the side walls, thus allowing the top side wall 11 to be of smaller outer diameter thus allowing the grinder top 4 to slide down over the grinder bottom 1 to engage the grinding knives.

Although the present invention has been described in considerable detail, those skilled in the art will appreciate that numerous changes and modifications may be made to the embodiments and preferred embodiments of the invention and that such changes and modifications may be made without departing from the spirit of the invention. It is therefore intended that the appended claims cover all equivalent variations as fall within the scope of the invention.

What is claimed is:

1. A grinder comprising:
    a top cap, a grinding section, and a reservoir section;
    wherein said top cap having a bottom opening and a plurality of top grinding knives oriented in a circular fashion around the center and protruding downward, wherein said top grinding knives are arrow shaped, having an arrow head and an arrow tail, spatially oriented such that there are three pairs of grinding knives wherein each pair has the arrow heads orienting towards one another around a circular plane, and orients the tail of each arrow to the tail of an adjacent arrow of another pair around the circular plane;
    a central knife having a six sided star shape that is spatially oriented on the center axis of the top cap and wherein the three pairs of grinding knives are spatially oriented around the center axis;
    said grinding section having a top opening that is capable of being removably inserted into said bottom opening of said top cap, a bottom opening, and a plate circumferentially attached to the inner diameter of the grinding section, wherein said plate comprises four arrow shaped grinding knives, having an arrow head and an arrow tail that are spatially arranged away from the center axis of the grinder bottom, and are oriented in two pairs such that the pairs have the heads of the arrows pointed towards one another around a circular plane, and the tails pointing towards the tails of the opposing pair; wherein said arrow shaped grinding knives protruding upward and oriented around the center and a plurality of holes disposed of on said plate, wherein the top cap and the grinding section comprise a complementary pair of magnets for releasably securing the top cap to the grinding section; and
    a reservoir section, having a top opening and a bottom opening, said top opening having a diameter so as to pair with and removably secure to the bottom opening of said grinder section, and said bottom opening being of a smaller diameter than said top opening; said reservoir being non-opaque; said bottom opening having a bottom cap having a diameter to as to pair with and removably secure to said bottom opening.

2. The grinder of claim 1 further comprising wherein said grinding sections are slideably attached to one another so as to selectively attach.

3. The grinder of claim 1 further comprising wherein said grinding sections have male and female paired ends, so as to allow selective attachment of the bottom of said grinding section to the reservoir and the bottom of said grinding section to the bottom cap.

4. The grinder of claim 1 further comprising wherein said top grinding knives and said bottom grinding knives moveably interlace to allow said top cap to rotate around said middle section without contact between said knives.

5. The grinder of claim 1 further comprising wherein said plate comprises a set of four drop circles and four unequal oblong shaped holes, wherein the drop circles and the unequal oblong shape holes are oriented to alternate around a center axis, and wherein the outer edge of the holes and the unequal oblong shapes are about equal in relation to the space from the inner wall of the grinder section; and wherein the inner portion of the oblong shaped holes extends past the location of the grinder knives which are oriented to be in-front of the drop circles from the center axis.

6. The grinder of claim 5 wherein said drop circles and said unequal oblong shaped holes are oriented such that the plurality of grinding knives from the top cap rotate around the grinder knives in the grinder section, and over and above the drop circles and unequal oblong shaped holes.

* * * * *